UNITED STATES PATENT OFFICE.

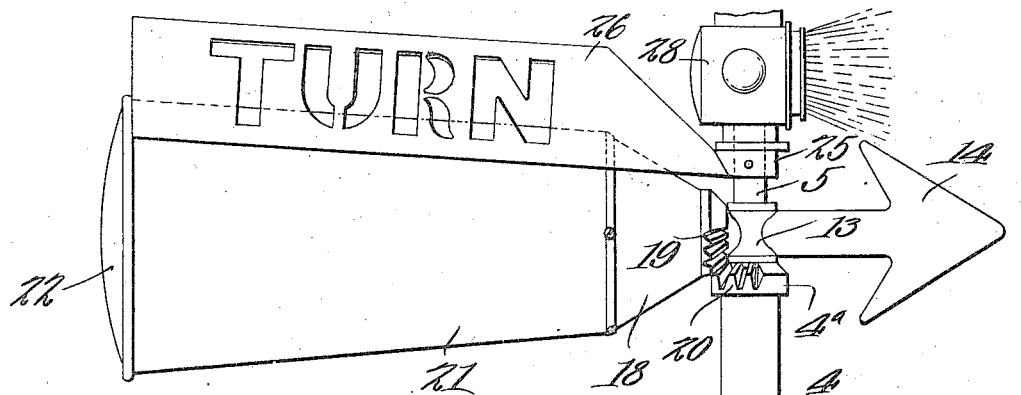

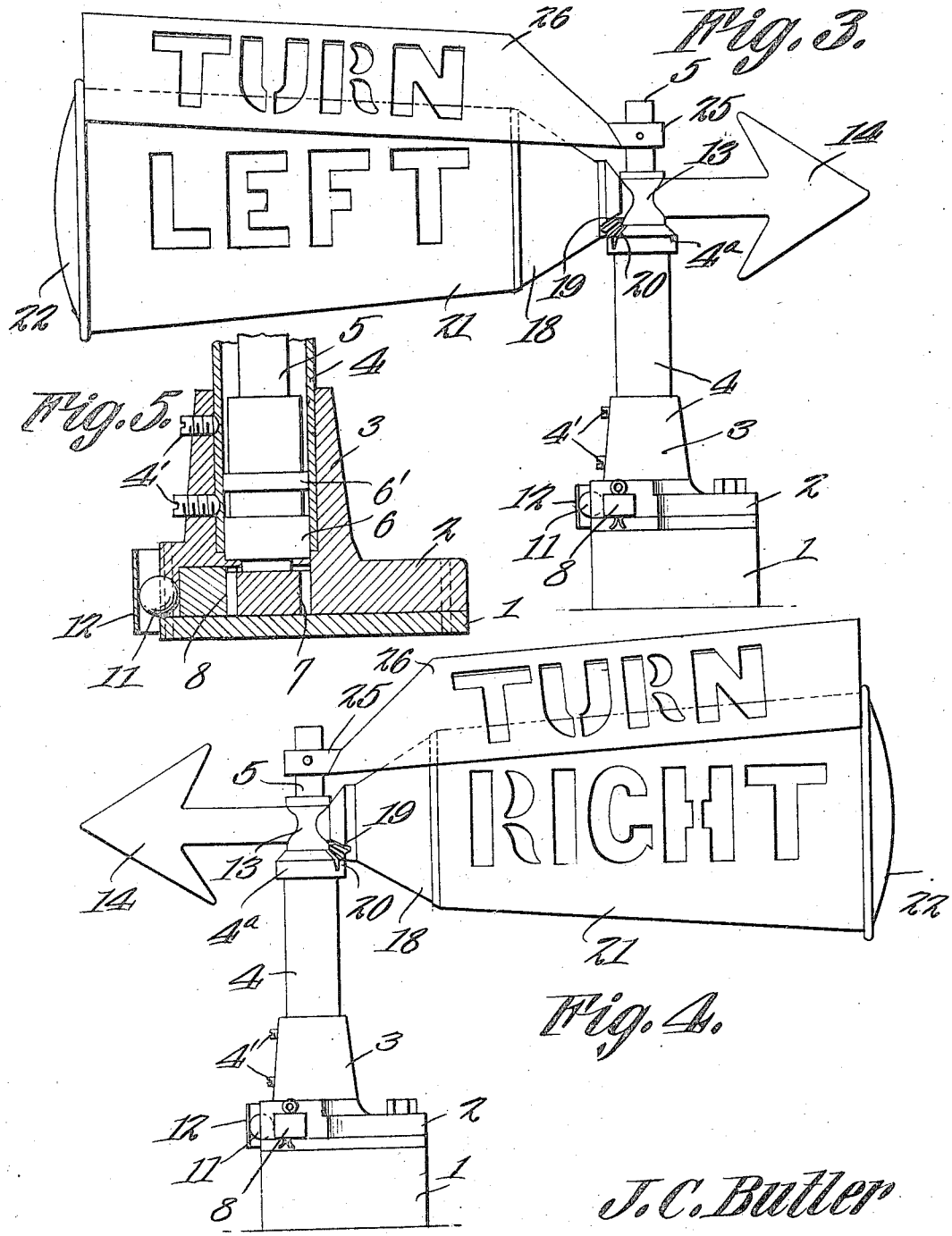

JOSEPH C. BUTLER, OF POMONA, CALIFORNIA.

MOTOR-CAR SIGNAL.

1,152,704.  Specification of Letters Patent.  Patented Sept. 7, 1915.

Application filed September 14, 1914. Serial No. 861,704.

*To all whom it may concern:*

Be it known that I, JOSEPH C. BUTLER, a citizen of the United States, residing at Pomona, in the county of Los Angeles and State of California, have invented a new and useful Motor-Car Signal, of which the following is a specification.

The present invention relates to improvements in motor car signals, one object of the invention, being the provision of a device of this character which is readily attachable at the front or rear of a motor car and operable from the seat thereof, to readily indicate to an approaching car either from the front or rear the intention of the operator of the motor car, as to which direction he is to turn or whether he is going straight ahead.

A further object of the present invention, is the provision of a device of this character, in which an oscillatory drum carries the words preferably "Right" and "Left" and has disposed therein, a lamp, which is adapted to be swung at either side and at the same time rotated to display the selected word to indicate to an approaching vehicle the intention of the operator of the motor car.

A still further object of the invention, is the provision of a stationary shield movable with the shaft of the present device, and which prevents the rays of light projected through the perforated or cut portions of the oscillatory member from being shown when the operator is moving straight ahead.

A still further object of the invention, is the provision of a simple and inexpensive device of this character, which is durable in construction and thoroughly efficient and practical in operation.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a side elevation of the device in normal position, the arrow indicating the normal direction of the same relatively to the supporting base. Fig. 2 is a longitudinal sectional view through the complete device. Fig. 3 is an elevation of the present device showing the parts in the position they assume when the operator indicates that the motor car is turning to the left. Fig. 4 is a similar view showing the parts in the position they assume when the operator desires to turn to the right. Fig. 5 is a cross section through the gear and rack casing of the present device.

Referring to the drawings, the numeral 1 designates the support, which may be a bracket, the mud guard, or in fact, any part of the motor car to which the present device is to be applied, said device being adapted to be applied at the rear or at the front of the vehicle and to be operated singly or in pairs as may be found desirable.

Carried by the support is a casing 2, which is provided with the tubular supporting member 3 in which is mounted the tube or sleeve 4, said sleeve 4 being held in place by means of the set screws 4'. Mounted within the sleeve 4 for rotation, is a vertical shaft 5, which is provided with the bearing collars 6—6' at its lower end within the sleeve 4 and having fixed upon its extreme lower end, the pinion 7, which meshes with the toothed rack 8, which is mounted for reciprocation in the casing 2. This rack is adapted to be connected at either end at 9 by a rod 10 or flexible connection for reciprocating the rack.

In order to hold the rack 8 resiliently in engagement with the pinion 7, and at the same time lock the same in any one of the three positions to which it is adapted to be placed for operating the present signal, a ball 11 held in place by the resilient spring plate 12 for coöperation with centering recesses (not shown) of the rack 8 is employed.

Fixed upon the shaft 5 above the upper end of the sleeve 4 and its enlarged end 4ª, is a collar 13, provided with the arrow 14 at one side and with the tubular arm or shaft 15 at the opposite side. The shaft 5 is preferably hollow, so as to permit of the disposition therethrough and through the arm or shaft 15 of the current carrying wires W which are connected to the lamp socket member 16 for properly leading current to the electric light or lamp 17. It is also possible that acetylene gas may be directed through the tubular shaft 5 and that in place of the electric lamp 17 an acetylene burner may be employed, as may be found most desirable.

Mounted for rotation upon the arm or shaft 15 is the frusto-conical member 18 having the journaling sleeve 18′, said member being provided with the mutilated gear 19 for coöperation with the mutilated gear 20 of the end 4ª. It will thus be seen that when the shaft 5 is rotated, that the arm 15 will be rotated therewith, and that as the member 4ª is stationary, with the sleeve 4, that the coöperating gears 19 and 20 will cause the rotation of the frusto-conical member 18, and the signal carrying casing 21, which at its outer end is sealed by the lens or transparent member 22 which is preferably colored, as red.

When the parts are in the position as shown in Figs. 1 and 2, the words "Right" and "Left" as clearly shown in Fig. 2 are hidden by the hood 26, whose collar 26 is fixed to and rotatable with the shaft 5. This hood 26 is provided with the end projecting flange or rim 27 while formed through the metal thereof by stenciling or otherwise, is the word "Turn", there being two of such words cut in the hood 26 so that in either direction that the present device may assume, one word is visible.

Adapted to be connected to the upper end of the shaft 5 and consequently be movable therewith, is a lamp 28, whose lens portion is toward or projects in the direction of the arrow 14, this light being either the fore light of an automobile or the tail light according to the installation of the present device.

From the foregoing description, taken in connection with the drawings, it is evident that by the reciprocation of the rack 8, that the shaft 5 will be rotated and thus move the hood 26 to one side or the other as is desired and simultaneously rotate the drum 21 so that either word Right or Left is brought into vision, as clearly illustrated in the respective Figs. 3 and 4.

What is claimed is:

1. An automobile signal including a hood, a rotatable signal carrying member adjacent the hood and having annularly spaced characters either of which is adapted to be concealed by the hood, means for simultaneously swinging the hood and signal carrying member about a common axis, and means for rotating the signal carrying member about its individual longitudinal axis during its rotation with the hood thereby to withdraw a character from the hood and expose it and house another character within the hood.

2. An automobile signal including a hood, a rotatable signal carrying member adjacent the hood and having annularly spaced characters either of which is adapted to be concealed by the hood, means for simultaneously swinging the hood and signal carrying member about a common axis, and means for rotating the signal carrying member about its individual longitudinal axis during its rotation with the hood thereby to withdraw a character from the hood and expose it and house another character within the hood, there being characters on the hood readable in connection with either of the characters on the signal carrying member, and means carried by said signal carrying member for eliminating all of the characters on said member.

3. An automobile signal, including a support, a vertically disposed tubular member carried thereby, a shaft journaled in the tubular member, means for oscillating the shaft, a hood carried upon the upper end of the shaft, a rotatable signal carrying member attached to and carried by the shaft and disposed below the hood, and coöperable means carried by the signal carrying member and sleeve for imparting independent rotation to the signal carrying means coincident with the oscillation or rotation of the shaft.

4. An automobile signal, including a support, a sleeve carried thereby, a shaft journaled in the support and sleeve, coöperative means mounted in the support and carried by the shaft for imparting oscillation to to the shaft, a hood fixed to the upper end of the shaft and movable with the shaft, said hood being disposed to project radially therefrom, a collar fixed upon the shaft above the tube, an arm carried by the sleeve, a rotatable signal carrying member mounted upon the arm, and coöperative means carried by the tube and the signal carrying member, whereby as the shaft is oscillated, independent oscillation or rotation is imparted to the signal carrying member, such signal carrying member being disposed below the hood.

5. An automobile signal, including a support, a sleeve carried thereby, a shaft journaled in the support and sleeve, means mounted in the support and connected to the shaft for oscillating the shaft, a hood fixed to the upper end of the shaft and projecting radially therefrom, an independent rotatable signal carrying member connected to the shaft and disposed below and in alinement with the hood, and coöperative means carried by the sleeve and the adjacent portion of the signal carrying member, whereby as the shaft is oscillated, the signal carrying member is oscillated.

6. An automobile signal, including a support, a sleeve carried thereby, a shaft journaled in the support and sleeve and having its upper end projecting above the sleeve, coöperable means carried upon the lower end of the shaft and within the support for rotating the shaft, two oppositely extending arms attached to the shaft above the sleeve, a signal carrying member rotatably mounted upon one of the arms, coöperative means carried by the sleeve and the signal carrying member, whereby as the shaft is rotated, the signal carrying member is rotated upon the arm, and a hood attached to the shaft and superposed relatively to the signal carrying member.

7. An automobile signal, including a support, a sleeve carried by the support, a shaft journaled in the sleeve and support, means carried within the support and by the shaft for rotating the shaft, a collar having oppositely disposed arms fixed to the shaft above the sleeve, a frusto-conical member having a journaling sleeve mounted upon one of the arms, coöperative means carried by the frusto-conical member and the upper end of the sleeve, whereby as the shaft is rotated, the frusto-conical member is rotated, a signal carrying member attached to and carried by the frusto-conical member, and a hood attached to the shaft and disposed to fit above and engage a portion of the signal carrying member.

8. An automobile signal, including a support, a sleeve carried by the support, a shaft journaled in the sleeve, a pinion carried upon the lower end of the shaft, a toothed rack bar mounted in the support for reciprocation, the teeth thereof being in engagement with the pinion, a collar attached to the shaft above the sleeve, an indicating point projecting from one side thereof, a tubular shaft projecting from the opposite side thereof, a frusto-conical member having a journaling sleeve mounted for rotation upon the tubular arm, a lamp carrying means attached to the inner end of the arm, a signal carrying casing provided with stenciled signal notation attached to and carried by the frusto-conical member and incasing a lamp, coöperative means carried by the frusto-conical member on the upper end of the sleeve, whereby as the shaft is rotated, the frusto-conical member and signal carrying casing is rotated, and a hood for the projected rays of light of the signal casing attached to the shaft and superposed relatively to the casing.

9. An automobile signal, including a support, a sleeve carried by the support, a shaft journaled in the sleeve, a pinion carried upon the lower end of the shaft, a toothed rack bar mounted in the support for reciprocation, the teeth thereof being in engagement with the pinion, a collar attached to the shaft above the sleeve, an indicating point projected from one side thereof, a tubular shaft projecting from the opposite side thereof, a frusto-conical member having a journaling sleeve mounted for rotation upon the tubular arm, a lamp carrying means attached to the inner end of the arm, a signal carrying casing provided with a stenciled notation attached to and carried by the frusto-conical member and incasing the lamp, coöperative means carried by the frusto-conical member on the upper end of the sleeve, whereby as the shaft is rotated, the frusto-conical member and signal carrying casing are rotated, and a hood for the projected rays of light of the signal casing attached to the shaft and superposed relatively to the casing, said hood being provided with the stenciled words to indicate in coöperation with the words of the signal the intention of the operator.

In testimony that I claim the foregoing as my own, I have hereto affixed my signature in the presence of two witnesses.

JOSEPH C. BUTLER.

Witnesses:
JAMES E. BURNHAM,
W. W. MEYERS.

Copies of this patent may be obtained for five cents each, by addressing the "Commissioner of Patents, Washington, D. C."